April 21, 1936. J. W. HUGHES 2,037,787
POWER TRANSMISSION MECHANISM
Filed Oct. 20, 1932 4 Sheets-Sheet 1

INVENTOR.
JAMES W. HUGHES.
BY
ATTORNEYS.

April 21, 1936.　　　J. W. HUGHES　　　2,037,787
POWER TRANSMISSION MECHANISM
Filed Oct. 20, 1932　　　4 Sheets-Sheet 2

INVENTOR.
JAMES W. HUGHES.
BY
ATTORNEYS.

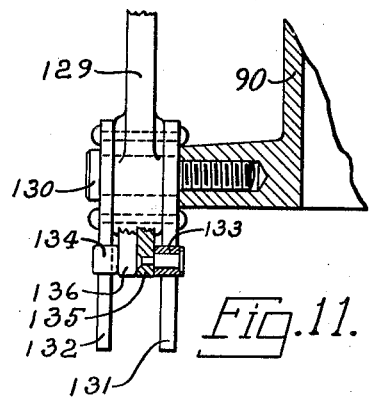
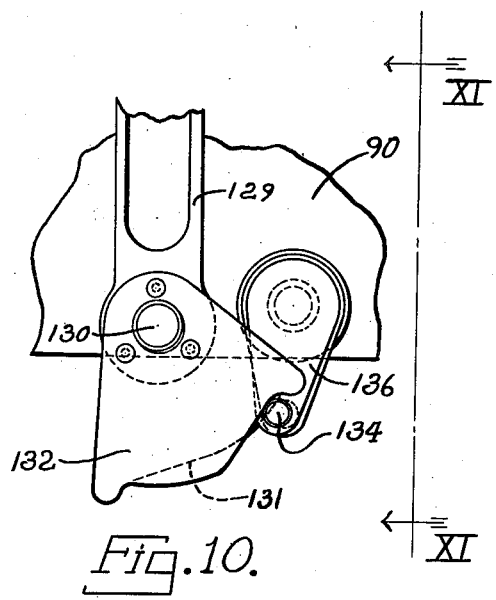
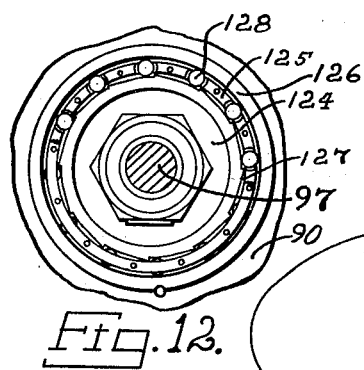
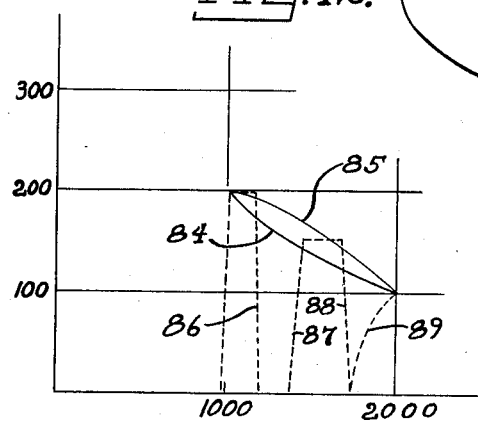
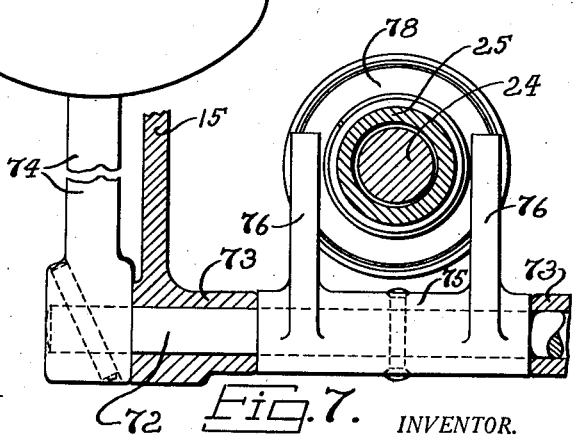
INVENTOR.
JAMES W. HUGHES.

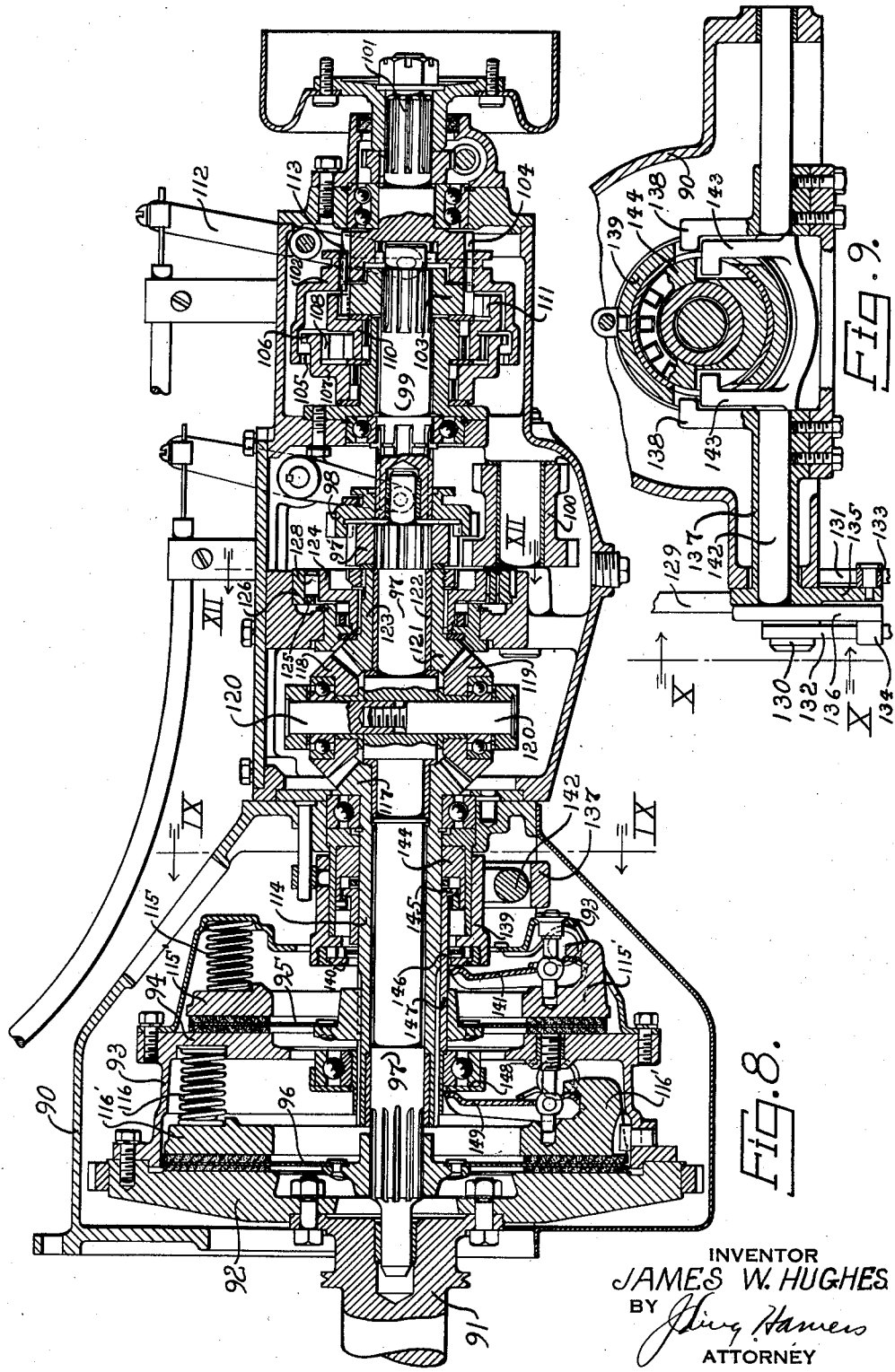

Patented Apr. 21, 1936

2,037,787

UNITED STATES PATENT OFFICE 2,037,787

POWER TRANSMISSION MECHANISM

James W. Hughes, Detroit, Mich., assignor to Chrysler Corporation, Detroit, Mich., a corporation of Delaware Application October 20, 1932, Serial No. 638,797

3 Claims. (Cl. 74—280)

This invention relates to combined clutch and transmission mechanisms for vehicles.

The main objects of the invention are to provide a combined clutch and transmission unit which is adapted to establish direct and low speed driving relations respectively between driving and driven members, and to provide a unit of this character which is adapted to gradually increase the speed and decrease the torque relations between the driving and driven members from the low speed relation to the high speed relation and by which power is continuously transmitted from the driving member to the driven member during the transfer from the low to the high speed driving relation.

Other objects of the invention are to provide between the driving and driven members a pair of intermediate driven shafts which are connected with the driven member and with each other through compensating gearing in such a manner that one of said shafts may be driven in unison with the driving member to produce a low speed driving relation or another intermediate shaft may be driven in unison with the driving member to produce a direct speed driving relation between the driving and driven members, and to provide a system of this character in which either both or one of the intermediate shafts may be rotated by said driving member at a lower rotative speed than the latter for applying the driving influence of all of said intermediate shafts upon the driven member so as to progressively increase the rotative speed of the latter to the rotative speed of the driving member.

Further objects of the invention are to provide individual clutch elements on the high and low speed intermediate shafts for selectively producing high and low speed driving relations respectively between said driving and driven members; to provide clutch elements of this character which are engageable with and adapted to be driven by the same driving mechanism; to provide means for connecting one of the intermediate shafts with the final driven member of the transmission in a direct driving relation and for connecting the other intermediate shaft therewith in a reduced speed driving relation; to provide speed reducing mechanism of this kind which includes compensating gearing that is connected with the direct drive intermediate shaft and adapted to rotate the latter at the same speed as the final driven part of the transmission is rotated by the reduced speed mechanism when the clutch element of the latter is engaged; and to provide means of this character which prevents the useless consumption of power in bringing the direct driving parts up to the speed of the low speed clutch element when a transfer from a low to a high speed driving relation is effected; and to provide clutch elements of this kind which are adapted to rotate both the direct and reduced speed intermediate shafts in unison with the driving mechanism and to, by reason of slipping, rotate one or the other or both of said shafts at a lower rate than said driving member, whereby to obtain a varying mechanical advantage during the transfer from the low speed driving relation to the high speed driving relation.

Other objects of the invention are to provide a member in the reduced speed driving mechanism of a combined clutch and variable speed transmission which is rotatable by both the direct and low speed driving systems and which is adapted to automatically render the low speed driving mechanism ineffective by the time the direct speed driving mechanism is brought to the rotative speed of the driving member; to provide a member of this character which, under the influence of the reduced speed driving mechanism, tends to turn in one direction and which, under the influence of the direct driving mechanism, tends to rotate in an opposite direction; and to provide means for arresting the rotation of said member by said low speed driving mechanism so as to bring the latter into operation and which is adapted to permit free rotation of the member by said direct driving means so as to render the low speed driving mechanism ineffective by the time the direct driving mechanism is brought to the rotative speed of the driving member.

Further objects of the invention are to provide a combined clutch and transmission mechanism which requires only one manual control to bring about the direct and low speed driving relations; to provide operating mechanism having a pedal which, during movement in one direction, brings first one clutch element and then the other into engagement and which retains both clutch elements in disengaged relation when the pedal is in its normal position; and to provide clutch control mechanism which is adapted to bring the low speed clutch element into engagement with the driving member and to thereafter control the slippage between the driven member and the direct speed clutch element so as to predetermine the mechanical advantage of the transmission during the period of transfer from a low to a high speed driving relation.

An illustrative embodiment of the invention is shown in the accompanying drawings, in which:

Fig. 7 is a transverse sectional view taken on the line VII—VII of Fig. 1.

Fig. 8 is a longitudinal sectional view similar to Fig. 1, but showing a further development of my invention.

Fig. 9 is a transverse sectional view taken on the line IX—IX of Fig. 8.

Fig. 10 is a fragmentary side elevation showing the clutch control apparatus as it appears in the plane indicated by the line X—X of Fig. 9.

Fig. 11 is a fragmentary elevational view illustrating a portion of the clutch control mechanism as it appears in the plane indicated by the line XI—XI in Fig. 10 and showing some of the parts thereof in section.

Fig. 12 is a transverse sectional view taken on the line XII—XII of Fig. 8.

Fig. 13 is a comparative graph illustrating some of the advantages obtainable with applicant's improved clutch and transmission mechanism.

Figure 1:
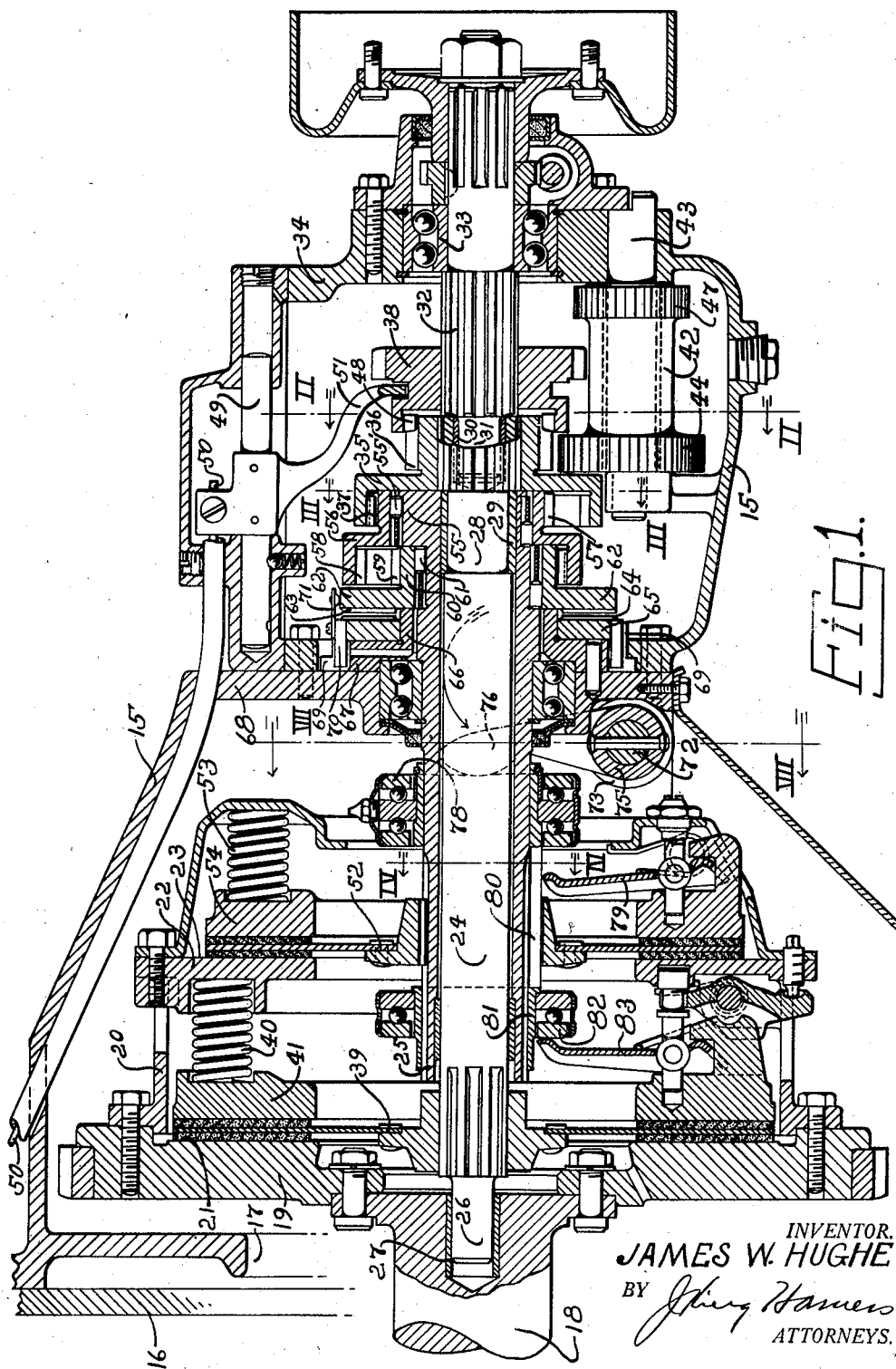
Fig. 1 is a longitudinal sectional view of a combined clutch and transmission mechanism which embodies my invention.
Figure 5:
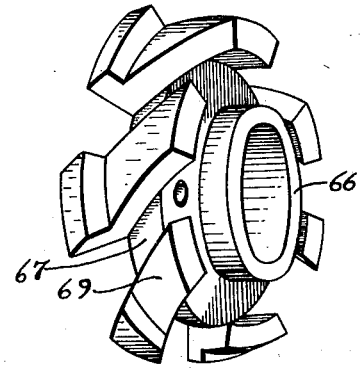
Fig. 5 is a perspective view illustrating in detail one of the parts of a device for preventing rotation of an element of the structure shown in Fig. 1 in only one direction.
Figure 6:
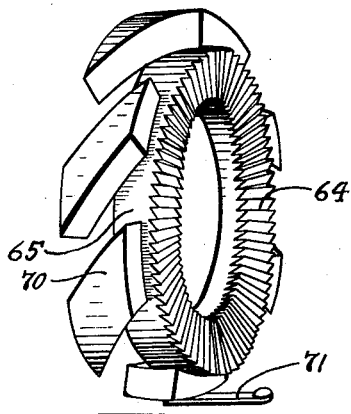
Fig. 6 is a perspective view of a part of the one-way stopping device which cooperates with the part shown in Fig. 5.
Figure 2:
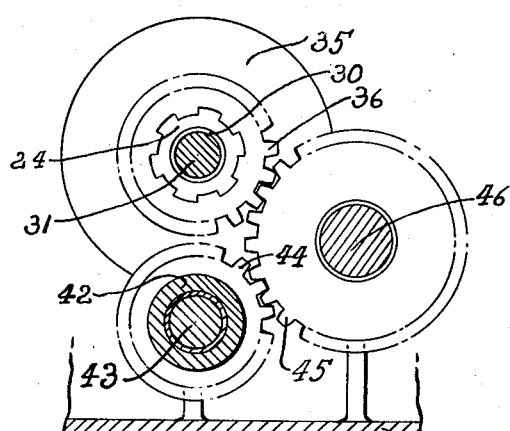
Fig. 2 is a transverse sectional view taken on the line II—II of Fig. 1.
Figure 4:
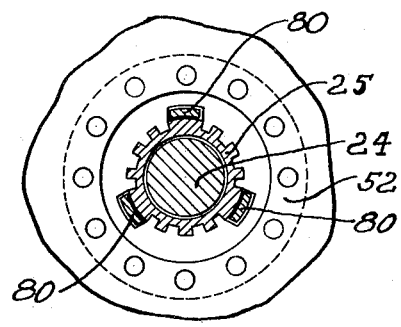
Fig. 4 is a transverse sectional view taken on the line IV—IV of Fig. 1.
Figure 3:
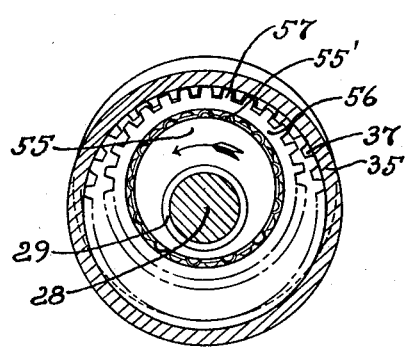
Fig. 3 is a transverse sectional view taken on the line III—III of Fig. 1.

The improved clutch and transmission mechanism of this invention includes a driving member with which is associated a pair of friction clutch elements. One of the friction clutch elements is non-rotatably fixed on a direct driving mechanism which is adapted to establish a direct driving relation between the driving member and a driven member. The other friction clutch element is non-rotatably fixed to reduced speed driving apparatus which is adapted to establish a low speed and increased torque driving relation between the driving and driven members. The reduced speed driving mechanism includes speed reducing gearing of a compensating type which has an element rotatable by both the low speed driving mechanism and a part of the direct driving mechanism which is connected with the driven member. For this reason, when the driven member is rotated through the speed reducing gearing, the direct driving mechanism is also rotated at the same speed as the driven member.

The speed reducing gearing is also associated with apparatus for automatically rendering the reduced speed driving mechanism inoperative when the direct driving mechanism has been energized by engagement of its clutch element to an extent capable of opposing the torque resisting rotation of the driven member. In the form shown, this apparatus includes a one-way stopping device which functions in the manner of a free wheeling clutch. The one-way stopping device holds one of the elements of the gearing against rotation under the influence of the low speed driving mechanism, thereby causing the torque of the low speed driving mechanism to be applied upon the driven member. This one-way stopping device is so constructed and arranged as to permit free rotation of that part of the gearing upon which it operates in the direction in which such part is urged by the direct driving mechanism. By virtue of the above described structure, the sudden momentary cessation of the driving torque which occurs in a conventional transmission at the transfer from one speed to another speed is completely eliminated.

My improved combined clutch and transmission mechanism may be used in any machine wherein it is desired to vary the mechanical advantages between driving and driven members, and it is particularly adapted for use in motor vehicles. In the form shown in Figs. 1 to 7, inclusive, the clutch and transmission mechanism is confined within the housing 15 which is bolted or otherwise suitably fixed to the rear end of an engine crankcase 16. The housing 15 is provided with an opening 17 adjacent the crankcase through which extends an external end of a crankshaft 18. Mounted on the end of the crankshaft 18 is a flywheel 19 which is provided on one side with a casing 20. The flywheel 19 has a machined side face 21. A ring 22, which is concentric with the flywheel 19, is rigidly fixed to the casing 20. This ring also has a machined side face 23. The flywheel 19, casing 20, and ring 22 constitute a driving member and the machined faces 21 and 23 are adapted to coact frictionally with clutch elements hereinafter described.

Rotatably mounted in the housing 15 is a pair of inner and outer concentric shafts 24 and 25, respectively. The inner shaft 24 has a reduced end portion 26 on its left extremity which is journaled in a bearing 27 seated in an aperture in the end of the crankshaft 18. This shaft is also provided intermediate its ends with a reduced bearing portion 28 which is journaled in a bearing 29 confined within the inner shaft 25. Formed in the right extremity of the shaft 24 is an opening in which is mounted a bearing 30 for rotatably supporting a reduced end portion 31 of a final driven shaft 32 which is journaled at its right end portion in a bearing 33 mounted in the right end wall 34 of the housing 15. A gear 35 having external teeth 36 and internal teeth 37 is splined on the right end of the shaft 24. This gear is releasably, non-rotatably coupled with the final driven shaft 32 by a shiftable clutch element 38 so as to provide a direct driving relation between the shaft 24 and the final driven shaft 32.

A clutch element 39 is splined on the left end of the shaft 24 and located adjacent the machined face 21 of the flywheel 19. This clutch element is normally yieldably urged against the flywheel by circumferentially spaced clutch engaging springs 40 which bear between the ring 22 which is fixed to the housing 20 and a shiftable ring 41 which contacts with one side of the clutch element 39. When the clutch element 39 is engaged a direct drive is provided between the flywheel 19 and the final driven member 32.

The transmission mechanism is provided with reverse driving apparatus which includes a countershaft 42 journaled on a shaft 43 which is mounted in the transmission housing 15. The countershaft 42 has gear teeth 44 on one end which are permanently meshed with the teeth of an idler gear 45 journaled on a shaft 46. The teeth of the idler gear 45 are permanently meshed with the external teeth 36 of the gear 35 on the shaft 24. Formed on the right end of the countershaft 42 are gear teeth 47 which are adapted to mesh with the teeth of the shiftable clutch element 38 when the latter is moved to the right, as viewed in Fig. 1, so as to establish a reverse driving relation between the shafts 24 and 32. As the clutch element 38 is moved to the right, engagement between the external teeth 36 of the gear 35 and internal teeth 48 of the shiftable clutch member is discontinued before the clutch element engages with the gear teeth 47 of the countershaft 42.

The shiftable clutch element 38 is operable by manual control means which includes a bar 49 that is shiftably mounted in the transmission housing and positively connected with a control device, not shown, by a cable 50. Fixed to the bar 49 is a shifter fork 51 which is received in a peripheral groove formed in the shiftable clutch element 38.

A low speed clutch element 52 is splined on the external tubular shaft 25 and located adjacent the machined face 23 of the ring 22. This clutch element is normally yieldably urged against the ring 22 by a spring 53 which bears at one end upon the extremity of the clutch casing 20 and at its other end upon a shiftable ring 54 which abuts against one side of the clutch element 52.

Formed on the right end of the tubular shaft 25 is a cam 55 which rolls upon rollers 55' within a gear 56 disposed eccentrically with respect to the axis of the shaft 24. This eccentric gear is provided with external teeth 57 which mesh with the internal teeth 37 of the gear 35, and it is also provided with internal teeth 58 which mesh with external teeth 59 of a gear 60 that is rotatably mounted by rollers 61 upon the tubular shaft 25 in a concentric relation with respect to the latter. The gear 60 has a radial flange 62 on the left side of which are formed teeth 63 that are adapted to interlock with teeth 64 formed upon a ring 65 when the gear 60 is rotated slightly in a clockwise direction. The ring 65 is journaled upon a collar 66 of a disc 67 which is non-rotatably fixed to an intermediate wall 68 of the transmission housing 15. Formed on the outer periphery of the disc 67 are spiral splines 69 between which extend spiral splines 70 which are fixed to the outer periphery of the ring 65. The ring 65 is also provided with a resilient finger 71 which frictionally engages the outer periphery of the flange 62. The pitch of the splines 69 and 70 is such that when the gear 60 is turned slightly in a clockwise direction, as viewed from the right in Fig. 1, the ring 65 is screwed outwardly to the right so as to bring the teeth 63 and 64 into interlocking engagement, thereby preventing further clockwise rotation of the gear 60.

When the gear 60 is driven in a counter-clockwise direction the finger 71 drives the ring 65 in a corresponding direction and moves the teeth 64 thereof out of engagement with the teeth 63, permitting free rotation of the gear 60 in such direction.

The tubular shaft 25, its clutch element 52, and the above described compensating gearing with which it is associated, constitute an intermediate driven mechanism which produces a reduced driving relation between the driven member of the transmission and the final driven shaft 32 thereof. Engagement and disengagement of the clutch elements 39 and 52 may be brought about by clutch operating mechanism shown in Figs. 1 and 7. This apparatus includes a shaft 72 which is journaled in bearings 73 in the transmission housing 15 and on which is fixed an operating member 74, such as a pedal. A fork 75 is non-rotatably secured to the shaft 72. The fork 75 includes arms 76 which bear against a collar 78 slidably mounted on the tubular shaft 25. The shiftable collar 78 is engageable with clutch disengaging fingers 79 carried by the clutch casing 20 and pressure ring 54. When the clutch disengaging fingers 79 are rotated in a counter-clockwise direction, as viewed in Fig. 1, they urge the pressure ring 54 to the right against the compression of the springs 53, thereby disengaging the clutch element 52.

The collar 78 is provided with leftwardly extending bars 80 which are slidably mounted in keyways formed in the hub portions of the clutch element 52. Fixed on the left end of the bars 80 is a sleeve 81 having a ring 82 journaled thereon. The ring 82 is engageable with clutch disengaging fingers 83 which are carried by the disc 22 of the clutch casing and by the pressure ring 41. When the clutch disengaging fingers 83 are urged in a counter-clockwise direction by leftward movement of the ring 82 during rotation of the shaft 72 and finger 76 in a counter-clockwise direction, they urge the pressure ring 41 away from the clutch element 39 against the action of the springs 40.

In the illustration shown in Fig. 1, both clutch elements are engaged and the clutch fingers 79 and 83 are so disposed with respect to the shiftable collar 78 and ring 82 as to cause disengagement of the clutch element 39 before the clutch element 52 is disengaged and to cause the clutch element 52 to be engaged before the clutch element 39 is engaged. With this mechanism a reduced driving relation is assured between the driving member and the final driven member of the transmission before a direct driving relation is produced.

In operation, when both the clutch elements 39 and 52 are held in disengaged positions by depression of the pedal 74, the flywheel 19 and the structure rigidly connected thereto and constituting the driving member of the mechanism is free to rotate. As the pedal 74 is released it turns in a clockwise direction, allowing the shiftable collar 78 and the ring 82 to move toward the right, as viewed in Fig. 1. The first stage of the movement of this structure causes disengagement of the clutch fingers 79 from the collar 78 and permits the springs 53 to urge the clutch element 52 into forced engagement with the ring 22 of the clutch casing 20. When the pedal 74 is only partly returned to its normal position, the engagement between the rotatable ring 82 and the clutch fingers 83 is still maintained so as to hold the clutch element 39 out of engagement with the flywheel 19.

When only the clutch element 52, which produces the low speed drive, is engaged, the tubular shaft 25 is rotated at the speed of the driven member in a counter-clockwise direction, as viewed from the right in Fig. 1. The cam 55 rotates in a counter-clockwise direction in unison with the tubular shaft 25 and in so doing it causes the eccentric gear 56 to be driven in a clockwise direction. The gear 56 in turn causes the gear 60 to be driven a slight distance in a clockwise direction until stopped by engagement of the teeth 63 and 64.

Slight rotation of the gear 60 in a clockwise direction is transmitted by the finger 71 to the disc 65, which is likewise turned in a clockwise direction. As the disc 65 turns in a clockwise direction it is screwed outwardly so as to bring the teeth 64 thereof into locked engagement with the teeth 63 of the gear 60. In this manner, the gear 60 is held against rotation in a clockwise direction. When the gear 60 is so held the direction in which the gear 56 is driven is reversed, thereby causing the gear 35, which is positively connected with the final driven shaft 32, to be driven in a counter-clockwise direction, as viewed from the right in Fig. 1. In this manner, a reduced speed driving relation is established between the driving member and the final driven shaft. The gearing 35 which is splined on the inner shaft 24 drives the latter during this stage at the same speed as the final driven shaft 32 is rotated, and the shaft 24 in turn causes the clutch element 39 to be rotated in unison with the final driven member 32. The difference in speed of movement of the flywheel 19 and clutch element 39 is materially reduced in this way and therefore engagement of the clutch element 39 does not result in the application of a severe drag upon the driving member, nor does it cause useless consumption of energy in synchronizing the parts of the transmission.

As the pedal 74 is permitted to return further toward its normal position, the clutch fingers 83 are allowed to turn in a clockwise direction, as viewed in Fig. 1, and the clutch element 39, which is connected in direct driving relation with the final driven member, is brought into forced engagement with the flywheel 19. Engagement of the clutch element 39 causes torque to be applied upon the final driven member 32 by the shaft 24. A certain amount of slippage occurs between the flywheel 19 and the clutch element 39 as the speed of the latter is increased from that of the driven member to the speed at which the driving member is rotated. During this transfer period the torque applied on the shaft 24 is combined with the torque applied by the reduced speed gearing, and as a result the rotative speed of the final driven member is gradually increased from that established by the speed reducing gearing to the rotative speed of the driving member. The final speed of the driven member is increased during this transfer period in inverse proportion to the slippage which occurs between the high speed clutch 39 and the flywheel 19.

By reference to the diagram shown in Fig. 13, it will be seen that if the driving member is capable of developing 100 ft. pounds of work at 2,000 R. P. M., and if the mechanical advantage of the gearing is 2 to 1, there will be developed 200 ft. pounds of work, neglecting frictional losses, at 1,000 R. P. M. when only the low speed clutch element is engaged. As the high speed clutch element is brought into engagement the torque falls off along the line 84 to 100 ft. pounds and the speed increases along the line 85 to 2,000 R. P. M. Loss of work due to slippage is represented by the area between these two lines.

When conventional selective gear shifting mechanism is employed the low speed torque drops abruptly substantially to zero along the dotted line 86 when the clutch is disengaged in order to shift the gears to an intermediate setting. The torque then rises along the dotted line 87 and it again falls off along the line 88 when the clutch is again disengaged, and finally when a direct drive is produced, the torque increases along the line 89 to that of the driven member. The area within the dotted lines, which represents the work lost in conventional transmissions, is grossly larger than the area representing the work lost by slippage in my improved mechanism.

When the direct driving clutch element 39 becomes fully engaged with the flywheel 19, the shaft 24 is driven at the speed of the driving mechanism and by reason of the meshed engagement of the internal teeth 37 of the gear 35, carried by the shaft 24 and the external teeth 57 of the eccentric gear 56, the latter is driven in a counter-clockwise direction. The eccentric gear 56 drives the gear 62 in a counter-clockwise direction. Counter-clockwise rotation of the gear 60 is permitted by the inclined teeth 63 and 64 of the one-way stop device. During rotation of the gear 60 in a counter-clockwise direction, the finger 71 rotates the ring 65 a limited distance in a corresponding direction and the cooperating splines of the ring 65 and disc 67 cause the ring to be retracted toward the left, as viewed in Fig. 1. This action renders the reduced speed mechanism inoperative.

If at any time the load upon the final driven member is great enough to cause one or both clutch elements to slip, the torque exerted upon these clutch elements will be combined and applied upon the final driven member in the above described manner.

The clutch and transmission mechanism shown in Figs. 8 to 12, inclusive, operates in substantially the same manner as the form of my invention described above, but a planetary type of compensating gearing is employed in place of the nest of internal and external gears.

The structure shown includes a transmission housing 90 into which a crankshaft 91 extends. The crankshaft 91 has a flywheel 92 fixed thereto on which is mounted a clutch casing 93 having an inwardly extending ring 94 rigidly connected with the flywheel. A clutch element 95 is located adjacent the ring 94 and a similar clutch element 96 is located adjacent the flywheel 92. The clutch element 96 is splined on a shaft 97 which extends longitudinally of the transmission housing 90 and which is releasably coupled by a gear 97' and a shiftable clutch element 98 with a shaft 99 which corresponds with the final driven shaft of the first form of the invention. The transmission shown in Fig. 8 is also provided with reverse gearing substantially identical with that described above and generally designated by the numeral 100, and the shaft 99 is connected with an auxiliary reducing gear unit having a propeller shaft 101. The shaft 99 may be connected in a direct driving relation with the propeller shaft 101 by causing the teeth of the shiftable clutch element 102 to mesh simultaneously with the teeth of the clutch element 103 on the shaft 99 and with the teeth of a clutch element 104 on the shaft 101. An extremely low gear ratio between the driving member and the propeller shaft 101 may be produced by bringing the internal clutch teeth 105 of the shiftable clutch element 102 into mesh with the external clutch teeth 106 of a gear 107 which is journaled concentrically with respect to the shaft 99 and which has internal teeth 108 that mesh with external teeth of a gear 110. The gear 110 has internal gear teeth 111 meshed with the teeth of the gear element 103. When the shiftable clutch element 102 is moved to the right by the control mechanism, generally indicated by the numeral 112, the clutch teeth 105 and 106 are brought into meshed engagement and the internal clutch teeth 113 of the shiftable element 102 are disengaged from the clutch teeth of the clutch element 103.

The friction clutch element 95 which is relied upon to establish the normal low speed driving relation between the driven member and the shaft 99 is splined upon a tubular shaft 114 which is concentric with the shaft 97. The clutch elements 95 and 96 are normally urged into engagement with the ring 94 and flywheel 92 by springs 115 and 116, respectively, which are carried by the clutch casing structure. The spring 115 bears upon a pressure ring 115' located adjacent the clutch element 95, and the spring 116 bears upon a pressure ring 116' located adjacent the clutch element 96. Formed on the right end of the shaft 114 is a beveled pinion 117 of a planetary gearing unit. The pinion 117 meshes with the pinions 118 and 119 journaled on the opposite ends of a cross pin 120 which extends through and is rigidly fixed to the shaft 97. The pinions 118 and 119 are in turn meshed with a pinion 121 which is journaled upon a bearing 122 mounted on the shaft 97. Formed on the pinion 121 is a collar 123 on which is splined a cam member 124 of an over-running clutch. The cam member 124 is journaled within a roller race 125 mounted in a stationary ring 126. The outer periphery of the cam member 124 is provided with cam faces 127 which coact with the rollers 128 in holding the cam member 124 and the pinion 121 against rotation in a clockwise direction, as viewed from the right in Fig. 8. This structure constitutes a one-way stopping device which effectively holds the pinion 121 against rotation in a clockwise direction and which permits free rotation of the pinion 121 in a counter-clockwise direction, as viewed from the right in Fig. 8. During such counter-clockwise rotation of the pinion 121, the rollers 128 assume the position shown in Fig. 12 and are disposed at the ends of the cam faces 127 which are closest to the axis of rotation of the device, thereby permitting free over-running action of the cam member 124 and the pinion 121.

The low and high speed friction clutches 95 and 96, respectively, may be accurately controlled by the clutch control apparatus illustrated in the drawings. This apparatus includes a single operating lever 129, such as a pedal, which is journaled on a pin 130, as illustrated in Fig. 10. Rigidly fixed to the pedal 129 is a pair of cam plates 131 and 132. The cam plates 131 and 132 operate upon rollers 133 and 134 carried by levers 135 and 136, respectively. The lever 135 is rigid with a tubular shaft structure 137 which is journaled in the transmission housing 90. The shaft 137 has integrally formed thereon a fork including a pair of arms 138. The arms 138 have lugs on their extremities which extend into recesses formed in a collar 139 which is concentric with the shafts 97 and 114 and which is shiftable relative thereto. Provided on the left end of the collar 139 is a rotatable ring 140 which registers with and is adapted to bear against clutch disengaging fingers 141 carried by the clutch casing 93 and a pressure ring 115'. When the operating member 129 is rotated in a counter-clockwise direction, as viewed in Fig. 10, the cam plate 131 rotates the lever 135 and the shaft 137 on which it is mounted in a counter-clockwise direction, thereby causing the arms 138 of the fork of the shaft 137 to urge the collar 139 to the left, as viewed in Fig. 8. This operation turns the clutch disengaging fingers 141 in a counter-clockwise direction, as viewed in Fig. 8, and causes the pressure ring 115' to be retracted against the action of the springs 115.

The lever 136 is rigidly fixed to a shaft 142 which is journaled within the tubular shaft structure 137. The shaft 142 has a fork intermediate its ends including fingers 143 which have lugs on their extremities extending into recesses in a collar 144. The collar 144 is mounted within the collar 139 in concentric relation thereto and is provided at its left end portion with a rotatable slip ring 145. The slip ring 145 bears against a sleeve 146 which is shiftably mounted on the exterior of the tubular shaft 114 and which is provided with leftwardly extending fingers 147 which pass through apertures in the hub structure of the clutch element 95. Mounted on the left end portion of the fingers 147 is a rotatable slip ring 148 which registers with and is adapted to bear against clutch disengaging fingers 149 carried by the ring 94 of the clutch casing and by the pressure ring 116'.

When the operating member 129 is rotated in a counterclockwise direction, as viewed in Fig. 10, the cam plate 132 rotates the lever 136 and the shaft 142 on which it is mounted in a counter-clockwise direction. During this operation the fingers 143 of the fork of the shaft 142 urge the collar 144 leftwardly. The slip ring 145 of the latter collar urges the shiftable sleeve 146 and the slip ring 148 connected thereto toward the left, as viewed in Fig. 8, thereby turning the clutch disengaging fingers 149 in a counter-clockwise direction so as to retract the pressure ring 116' against the action of the springs 116 and thereby disconnect the high speed clutch 96.

The cam surfaces of the cam plates 131 and 132 may be formed to the contour required to engage the clutch elements 95 and 96 in any desired sequence and timed relation. With the mechanism shown, which is particularly adapted for use in motor vehicles, these cam surfaces are so shaped as to cause the high speed clutch element 96 to be disengaged before the low speed clutch element 95 is disengaged upon rotation of the operating member 129 in a counter-clockwise direction, as viewed in Fig. 10. With this construction, as the operating member 129 rotates in a clockwise direction to its normal position, the low speed clutch element 95 is engaged before the high speed clutch element 96 is brought into engagement.

When only the low speed clutch element 95 is engaged a low speed driving relation is established between the driving member and the shaft 99. The over-running clutch constituting the one-way stopping device holds the pinion 121 against rotation in the direction in which it is urged by the torque derived from the low speed clutch element, and the pinions 118 and 119 are both revolved and rotated relative to the pinion 121 by the pinion 117 of the tubular shaft 114, thereby effecting a reduction in speed between the shaft 114 and the shaft 99.

As the high speed clutch element 96 comes into engagement, slippage occurs between the latter and the flywheel 92. This slippage, as set forth above, results in the combining of the torque exerted on the low and high speed clutch elements and the application of such combined torque upon the driven shaft 99. When the high speed clutch element is fully engaged the shafts 97 and 99 are driven in unison with the flywheel 92 and the pinions 118 and 119 of the planetary gearing unit are revolved as a unit. The over-running clutch permits the pinion 121 to rotate freely in a counter-clockwise direction, as viewed from the right in Fig. 8, when the parts of the planetary unit are rotated in unison during the direct driving stage. It will be seen that all of the advantages obtainable during the transfer from a low to a high speed driving relation with the structures shown in Figs. 1 to 7, inclusive, are also obtainable with the structure shown in Figs. 8 to 12, inclusive.

Although but several specific embodiments of this invention are herein shown and described, it will be understood that various changes, including the size, shape, and arrangement of parts, may be made without departing from the spirit of my invention, and it is not my intention to limit its scope other than by the terms of the appended claims.

What is claimed is:

1. A variable speed transmission including driving and driven members, a pair of friction clutch elements associated with said driving member, direct driving mechanism connected with one of said clutch elements and with said driven member, low speed driving mechanism connected with the other clutch element, a nest of permanently meshed internal and external gears operable by said low speed driving mechanism and connected with said driven member and having an element normally tending to turn in opposite directions under the influence of said direct and low speed driving mechanisms respectively, and a one-way stop member cooperating with said element for holding the same against rotation under the influence of said low-speed driving mechanism so as to transmit power from the latter to said driven member through said nest of gears, said element being rotatable relative to said stop member when the clutch element of said direct driving mechanism is substantially fully engaged.

2. A variable speed transmission including driving and driven members, a pair of friction clutch elements both associated with said driving member, means non-rotatably fixed to one of said clutch elements and connected with said driven member for providing a direct drive between said driving and driven members, speed reducing gearing interposed between and connected with the other clutch element and with said driven member for driving the latter at a lower speed than said driving member and having a member connected with said direct driving means for rotating the latter and its clutch element at the rotative speed of said driven member when the other clutch is engaged, a one-way stopping device adapted to hold one gear of said gearing against rotation by the latter so as to cause said gearing to drive said driven member, means for releasing said stopping device so as to render said gearing inoperative when the latter is driven by said direct driving means after both of said clutches are substantially fully engaged, and clutch operating mechanism adapted to successively engage the clutch of said speed reducing gearing and the clutch of said direct driving means in the order named.

3. A variable speed transmission including driving and driven members, a pair of friction clutch elements both engageable with said driving member, a shaft non-rotatably fixed to one of said clutch elements, a second shaft non-rotatably fixed to the other clutch element having a cam thereon, speed reducing means including a nest of permanently meshed external and internal toothed gears operable by said cam and connected with said driven member for driving the latter and said first mentioned shaft and the clutch element thereof at a reduced speed when the other clutch element is engaged, a one-way stopping member associated with said nest of gears for holding one thereof against rotation by said second shaft so as to cause the latter to drive said driven member, and means responsive to rotation of said gears by said first shaft for automatically releasing said stopping member when the latter shaft is conditioned to drive said driven member by substantially complete engagement of the clutch element of said first shaft.

JAMES W. HUGHES.